Feb. 7, 1967     J. T. HERBERT     3,302,885

SWIVELED ROCKET MOTOR NOZZLE

Filed June 22, 1962

INVENTOR.
JOHN T. HERBERT
BY
*Herbert E. Kidder*
AGENT

United States Patent Office 3,302,885
Patented Feb. 7, 1967

3,302,885
SWIVELED ROCKET MOTOR NOZZLE
John T. Herbert, Redlands, Calif., assignor, by mesne assignments, to Lockheed Aircraft Corporation, Burbank, Calif., a corporation of California
Filed June 22, 1962, Ser. No. 204,561
6 Claims. (Cl. 239—265.19)

The present invention relates generally to rocket motors, and more particularly to a controllable rocket motor in which the nozzle is swiveled for the purpose of directional guidance. The thrust vector of the exhaust jet is along the axis of the nozzle, and one of the most effective ways of guiding the rocket motor is by turning the nozzle through a small angular distance in one direction or another with respect to the longitudinal axis of the rocket motor. However, it is absolutely essential that the working clearances between the relatively movable parts of such a nozzle be tightly sealed against leakage of the extremely hot exhaust gases, as the slightest leak may result in catastrophic failure in a matter of seconds.

Heretofore, efforts to solve this problem have usually relied upon a rigid O-ring seal, mounted in an annular groove of the stationary section of the nozzle and wiping on the movable section. This arrangement prevents the O-ring from being directly exposed to the flow of hot gas, but it has the disadvantage of producing an unbalanced pressure condition within the nozzle swivel connection when the nozzle is deflected, which must be overcome by a relatively powerful actuating mechanism. This necessitates the use of gears and a strongly built driving mechanism, all of which contribute to a serious weight penalty for the vehicle. With the advent of propellants embodying high energy metallic additives and correspondingly higher temperatures, the sealing problem has become more aggravated because the metallic compounds tend to condense on the cooler surface of the O-ring seals, and thereby interfere with the free sliding of the O-ring over the movable section.

The primary object of the present invention is to provide a new swiveled rocket motor nozzle construction of the class described, in which the working clearances between the movable and stationary sections of the nozzle are positively sealed against gas leakage, without introducing any pressure unbalance within the swivel connection.

Another object of the invention is to provide a swiveled rocket motor nozzle in which the sealing means is entirely shielded from the flow of hot exhaust gases for all positions of the nozzle, although the sealing means is pressurized by the exhaust gas.

A further object of the invention is to provide a controllable, swiveled nozzled construction for rocket motors which is relatively light in weight and has a minimum power requirement for deflecting the nozzle, owing to the complete absence of unbalanced pressure conditions in the system.

These objects are achieved by using a ball and socket swivel connection, in which the movable part of the nozzle includes a ball portion which turns within a spherical socket in the stationary part of the nozzle. Bridging the working clearances between the ball and socket is an open-sided tubular thin wall torus of high strength steel, which serves as the primary sealing device. One edge of the torus is attached, as by welding, to the stationary part of the nozzle, while the other edge is attached to the movable ball portion. The interior of the torus is preferably packed with high temperature silicone grease or its equivalent, and the interior of the torus is open to the exhaust gas so that it is pressurized by the gas but is not exposed to the direct flow thereof. The spherical area of the ball over which the combustion chamber pressure acts is constant for all angles of deflection of the nozzle, and therefore there can be no unbalanced pressure condition within the system.

These and other objects and advantages of the present invention will become apparent to those skilled in the art upon consideration of the following detailed description of the preferred embodiment thereof, reference being had to the accompanying drawings, wherein.

Figure 1:
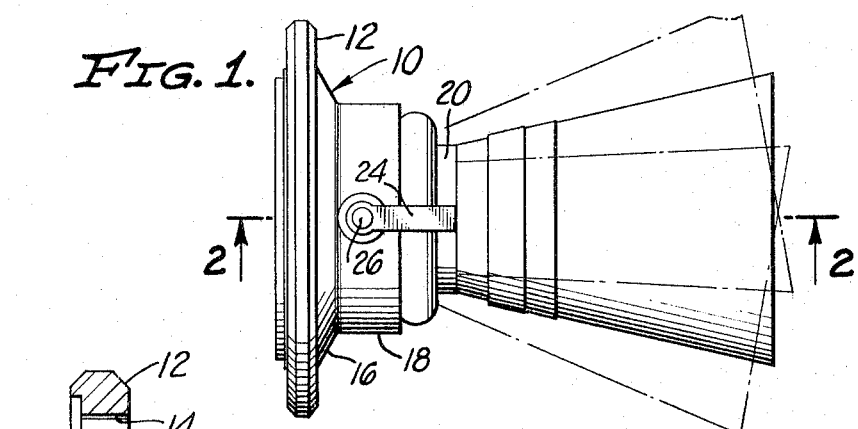
FIGURE 1 is a side elevational view of a swiveled rocket motor nozzle embodying the principle of my invention, showing in broken lines how the nozzle can be deflected to either side of the normal position.
Figure 2:
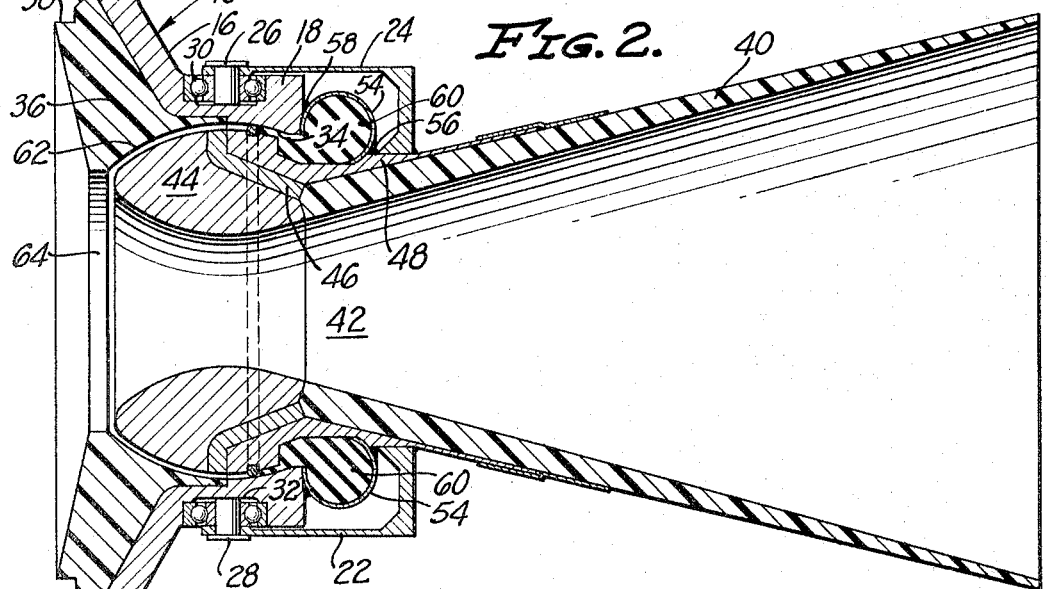
FIGURE 2 is an enlarged sectional view of the same, taken at 2—2 in FIGURE 1.
Figure 3:
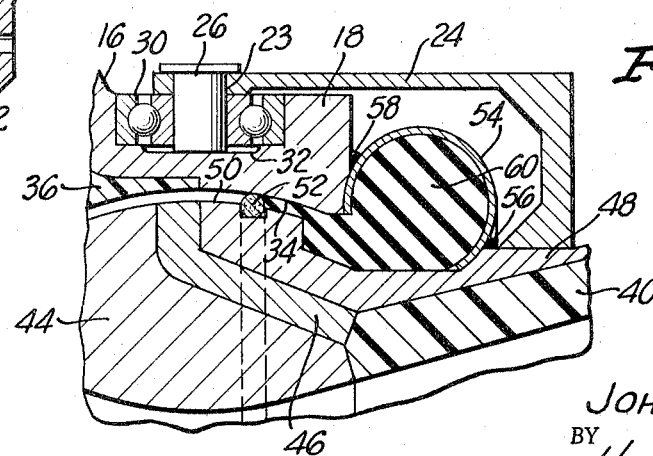
FIGURE 3 is an enlarged sectional view through the the sealing means of my invention.

In the drawings, there is an annular attachment mount 10 of steel or the like, which is provided with a peripheral flange, or footing ring 12, having a plurality of transverse apertures 14 to receive coupling elements, such as bolts or rivets (not shown), that secure the mount to the rear end wall of a rocket motor casing or the like, around the combustion chamber exhaust port. Downstream from the footing flange, an inwardly receding toroidal wall 16 merges with an annular neck 18 which is disposed generally perpendicular to the transverse plane of the outer flange 12, and approximately parallel to the exhaust stream, to define a continuing channel therefor.

The apex end 20 of a generally conically shaped nozzle is inserted centrally through the neck 18, and is pivotally supported by a diametrically opposed pair of flat-sided L-shaped arms 22, 24 having transverse apertures 23. The apertured end of each pivot arm remote from the attachment area 20 is carried by a flat-headed bearing pin or pivot 26, 28, each of which latter is centrally held in an annular ball-bearing raceway 30 that is housed in a corresponding outwardly opening socket, or recess 32, in the neck 18.

Radially inwardly from the bearing mounts 30, the neck 18 of the attachment mount is transversely enlarged to provide a spherically concave surface 34, while forward (i.e., toward the motor casing), the same spherical curvature is continued by the face of an inner plastic insulating ring or gasket 36, which underlies the angular wall 16 and has a projecting peripheral axial lip 38 disposed to seat in or overlie a corresponding groove or edge of the motor wall (not shown) to which the mount is attached. It will be noted that the center of the spherically curved surface 34 lies on the pivot axis defined by the pivot pins 26, 28.

Projecting rearwardly from the encircling components of the attachment assembly, is the generally conical body 40 of the expansion nozzle, which diverges, or expands in diameter toward the right in the drawing, from the radially restricted section 42 held within the mounting assembly. The diverging and laterally thinning walls of the cone 40 proper may be fabricated of synthetic heat resistant plastic, while a bulbous ring, or throat section 44, of heat resistant and chemically inert material such as graphite is fixedly joined to the cone 40 at least in part by attachment to an angular footing wall 46. Outwardly, the anchor wall 46 and cone 40 are jointly reinforced by an embracing steel skeletal structure 48, the anterior section of which conforms to the outer periphery of the anchor wall 46, radially opposite from which the throat support 48 has an externally spherical surface 50, closely conforming to the adjacent internal spherically curved surface 34 of the steel neck 18. Within an encircling groove of the convex area 50, there is disposed a soft ring seal 52 of flexible asbestos, impregnated with grease or rubber, which lightly seals the gap to the extent of reducing the eddy flows of the exhaust gas, but without restricting pressurization of the torus behind the ring seal, which will now be described.

Externally surrounding the supporting skeletal band 48, is a thin-walled torus 54 of flexible, high strength steel or other metal, having a generally C-shaped cross-sectional configuration, one edge of which is welded along an annular line of contact at 56 to the movable structure 48, and the other edge of which is welded along a concentric annular line of contact at 58 to the stationary neck 18. The torus 54 is essentially a cylindrical tube formed into an endless ring and split lengthwise to expose its interior, so that the interior 60 of the tube is in open communication with the narrow intersection 62 between the convex-concave slide surfaces, and thus is open to the pressure within the combustion chamber of the motor by way of the exhaust aperture. The purpose of pressurizing the torus 54 is to "inflate" it, so as to resist collapsing when the torus is deformed by angular displacement of the nozzle.

The semi-tubular torus 54 thus provides a flexible seal, positively insuring that there will be no leakage of the hot exhaust gases through the aperture 64, which represents the necessary working clearance between the movable and stationary parts of the nozzle. Rocking the nozzle from side to side on the bearings 26, 28, so as to change the direction of the thrust vector of the jet streams for guidance purposes, merely deforms the torus lengthwise a small amount without changing the area of the spherical surface 50 which is exposed to the high pressure of the combustion chamber, which would upset the symmetry of pressure applied against the surface 50. Thus, the pressure applied against the surface 50 is uniformly distributed about the longitudinal axis of the nozzle for all angular positions of the latter, and there are no unbalanced loads to be overcome.

For insulation purposes, the interior of the torus may be lined or filled with a viscous material, such as rubber, silicone based grease, or the like.

While I have shown and described in considerable detail what I believe to be the preferred form of my invention, it will be understood by those skilled in the art that various changes may be made in the shape and arrangement of the several parts without departing from the broad scope of the invention as defined in the following claims.

I claim:

1. A swiveled nozzle for a rocket motor, comprising a stationary part, and having a spherically curved socket portion provided therein on the longitudinal axis of the nozzle, a movable part having a spherically curved ball portion that is seated within said socket portion, said ball portion having a central passageway provided therein through which the exhaust gases of the motor pass, and a sealing member in the form of a thin-walled torus of high-strength metal surrounding said ball portion, said torus being of generally C-shaped cross-sectional configuration, one edge of said torus being welded along an annular line of contact with said stationary part, and the other edge thereof being welded along a concentric annular line of contact with said ball portion.

2. A swiveled nozzle for a rocket motor, said swiveled nozzle comprising a stationary part, a movable part journaled on said stationary part for swinging movement about a pivot axis, said stationary part having a spherically curved socket portion, said movable part having a spherically curved ball portion that is seated within said socket portion, the center of curvature of said spherically curved socket and ball portions lying on said pivot axis, said ball portion having a central passageway provided therein through which the exhaust gases of the motor pass, and a sealing member in the form of a thin-walled torus of high-strength metal surrounding said ball portion, said torus being of generally C-shaped cross-sectional configuration, one edge of said torus being welded along an annular line of contact with said stationary portion, and the other edge thereof being welded along a concentric annular line of contact with said ball portion.

3. The swiveled nozzle of claim 2, wherein the interior of said torus is pressurized by gases flowing through said nozzle.

4. The swiveled nozzle of claim 2, wherein the opening in said torus faces upstream with respect to the direction of flow of the exhaust gases through the nozzle, the interior of said torus being in communication with the working clearance between said ball and socket portions, whereby gas flowing through said working clearance pressurizes said torus.

5. The swiveled nozzle of claim 2, wherein said torus is lined with heat insulating material to shield it from the hot exhaust gases.

6. The swiveled nozzle of claim 2, wherein a ring seal of the exhaust gas, while at the same time allowing the within said working clearance, so as to reduce eddy flow of the exhaust gas, while at the same time allowing the exhaust gas to be admitted to the interior of said torus to pressurize the same.

References Cited by the Examiner

UNITED STATES PATENTS

| | | |
|---|---|---|
| 978,876 | 12/1910 | Greenlaw. |
| 2,165,052 | 7/1939 | Hering _____ 285—111 |
| 2,459,981 | 1/1949 | Warren _____ 285—111 |
| 2,613,087 | 10/1952 | Alford _____ 285—261 |
| 2,638,362 | 5/1953 | Sherman et al. _____ 285—111 X |
| 3,032,982 | 5/1962 | Gaubatz _____ 60—35.55 |
| 3,038,743 | 6/1962 | Zaloumis _____ 287—87 X |
| 3,048,977 | 8/1962 | Geary _____ 60—35.55 |
| 3,069,853 | 12/1962 | Eder _____ 60—35.55 |

FOREIGN PATENTS 625,005  6/1949  Great Britain.

MARK NEWMAN, *Primary Examiner.*

SAMUEL LEVINE, *Examiner.*

W. A. SCHUETZ, *Assistant Examiner.*